United States Patent Office 3,477,008
Patented Nov. 4, 1969

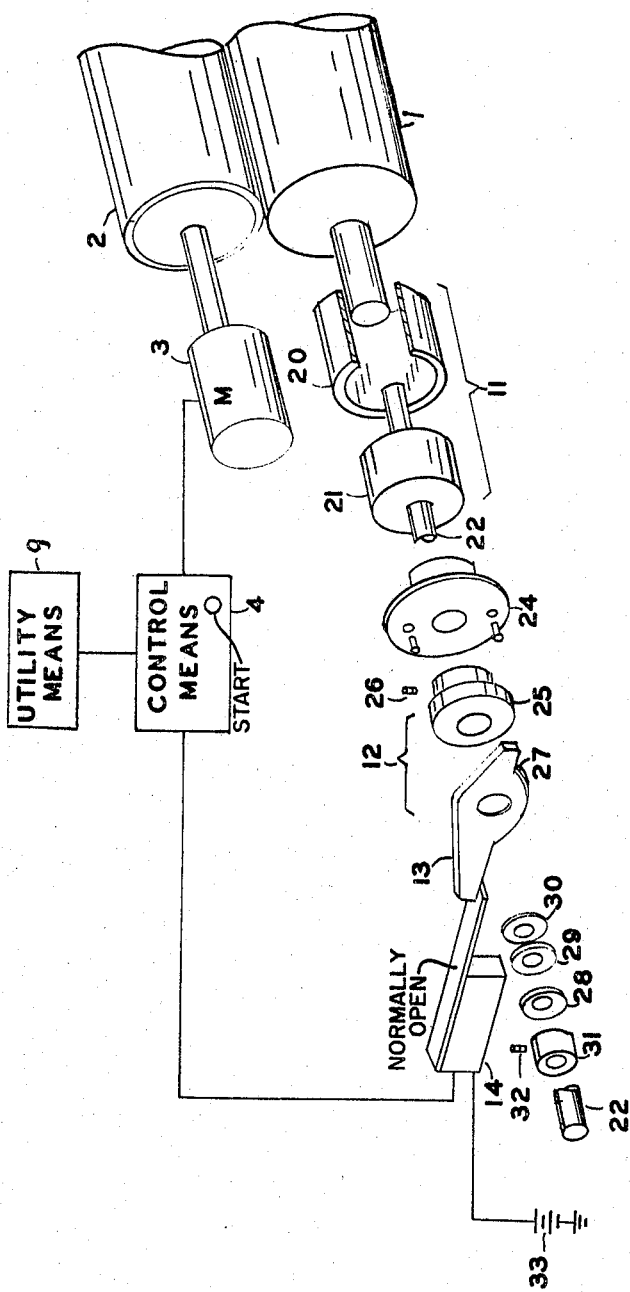

3,477,008
STALL DETECTOR FOR ROTATABLE SHAFT
Marvin I. Mindell, Great Neck, Andrew E. Heikkila, Hauppauge, Henry Harrison, Locus Valley, and Rudolph G. Wolz, Lake Ronkonama, N.Y., assignors to Viewlex, Inc., Holbrook, N.Y.
Filed May 12, 1966, Ser. No. 549,600
Int. Cl. H02h 7/08; G05b 5/05
U.S. Cl. 318—461                                   1 Claim

ABSTRACT OF THE DISCLOSURE

A stall detector for a rotatably driven shaft comprising a fluid coupling connected to the rotating shaft, an adjustable friction clutch connected to the fluid coupling, the output of the friction clutch being adapted to operate control or utilization means. The fluid coupling and the friction clutch cooperate to provide means to operate or control a spring loaded switch which will not overload the input device and which will not overload the spring loaded switch.

---

This invention relates to stall detectors for rotatable shafts.

It is frequently necessary or desirable to control or stop a machine or initiate some other safety control apparatus when an unusual load is placed on a rotating member so as to slow down or stop said member.

For instance, in a dry copy machine when papers jam the feed rollers it is necessary to immediately turn off the heat lamp to prevent damage. However, the invention is not limited to that apparatus but may be used wherever a rotatable shaft is slowed or stopped.

The present invention may be used to control safety indicators or other devices or any machine or mechanism that has rotatable parts.

The present invention generally comprises a fluid coupling connected to the rotating part, an adjustable friction clutch connected to the fluid coupling, the output of the friction clutch being adapted to control the spring loaded switch. The fluid coupling and the friction clutch cooperate to provide means to control the switch which will not overload the input device and which will not overload the spring loaded switch. Each of these conditions could happen if only one of the two coupling means are provided as will be explained in further detail.

Briefly, the fluid coupling means is adapted to be overcome by the spring loaded switch at a predetermined lower speed and the second friction coupling is adapted to slip at a predetermined higher speed so as to limit the loading of the input shaft by the first coupling at the predetermined higher speed. In other words, the two couplings cooperate to define torque limits at predetermined upper and lower speeds. The lower speed may be zero speed.

Experience with dry copy machines has indicated the desirability of a device which would sense the cessation of rotation of the rollers in the machine and cause the lamp to go off in order to protect the machine. Such conditions arise when the machine jams or when the glass breaks, the drive belt breaks, the motor stalls or the machine inordinately overheats.

A device was developed which serves to actuate a switch only when rollers are turning in the machine and de-actuates the switch a few seconds after the rollers cease to turn. This device may be applied to other appliances or mechanisms, which require rotary motion detection.

The stall detector consists of four major parts which are:
(1) The fluid coupling,
(2) Friction clutch,
(3) Actuator,
(4) Switch.

The fluid coupling is attached to a rotating shaft and consists of a cup or outer drum and an inner drum mounted coaxially within the outer drum. The input shaft is directly connected to the outer drum. The output shaft is brought out from the opposite side and is directly connected to the inner drum. The inner drum is completely sealed within the outer drum mounted on bearings located at either end of the outer drum and designed so that there is typically a .005″ space between it and the outer drum. This space is filled with a high viscosity silicon fluid which forms the fluid coupling between the outer and inner drum. Thus, as the outer drum turns, motion is transmitted through the fluid to the inner drum which rotates with a torque output proportional to its radius, surface area, fluid viscosity, relative rotational speed and inversely proportional to the width of the clearance space between the drums. As the rotation increases, torque output of the inner drum increases or conversely the loading on the outer drum increases to limit this torque output or loading a friction type clutch is provided.

The friction clutch is the second section of the device and consists of two disks, one with a felt face, which are pressed together. One disk is directly coupled to the output shaft of the fluid clutch. The other disk is connected to and forms part of the actuator.

The third section of the device is an actuator arm which is the output of the friction clutch. This is a lever which rotates upon rotation of the input shaft and actuates the fourth section of the device which is a snap-action type switch.

Accordingly, a principal object of the invention is to provide new and improved stall detector means for rotatable shafts.

Another object of the invention is to provide new and improved stall detector and control means for machines and mechanisms, having rotatable parts.

Another object of the invention is to provide new and improved anti-jam control means for machines or mechanisms for instance paper feeders, printing presses and the like.

Another object of the invention is to provide new and improved fast acting, sensitive, control means for machines or apparatus having rotatable parts.

Another object of the invention is to provide new and improved fast acting, sensitive control means for machines or apparatus having rotatable parts comprising a fluid coupling, a friction clutch connected to said fluid coupling, an actuator connected to an output of said clutch and a control spring loaded switch connected to be operated by said actuator.

These and other objects of the invention will be apparent from the following specification and drawing.

Referring to the figure, it is desired to control the operation of the rollers 1 and 2 which may be for instance paper feeding rollers. The roller 2 is adapted to be driven by the motor 3 in turn is adapted to be turned off by the control means 4 which may be a conventional motor control and switch 14.

For instance, if the rollers 1 and 2 are paper feeding rollers and the paper should become jammed, it is desired to stop the rotation of the machine immediately in order to prevent damage to the machine or the papers. It is also desirable for instance, in thermo copy machines to immediately turn off the heating lamp to prevent damage to the rollers or to the papers.

The control means of the present invention generally comprises a fluid coupling 11, an adjustable friction clutch 12 connected to the output of the fluid coupling, an actuator arm 13 mounted on the output of the friction clutch, and a control spring loaded switch 14 adapted to be operated by the actuator arm 13. The control switch 14 may be for instance to control the source of electricity to the control means which in turn may initiate other control or utility means 9 and the motor 3. The utility means 9 may be an indicator, an audible warning or other control device.

Alternatively, the switch 14 may be connected directly to the motor if the motor is of a relatively small size.

Starting may be accomplished by means of a starting circuit which, after activation, will remain in the supply circuit until the rollers approach normal speed; as the rollers approach normal speed the switch 14 will close into the supply circuit and thereafter the starting circuit will open. In this manner the switch 14 becomes critical to the supply circuit at normal speeds so that the circuit will open when the switch 14 is opened which will prevent motor operation at stall speeds.

Referring more specifically to the figure, the fluid coupling comprises an outer drum 20 which is connected to the shaft of roller 1 and an inner drum 21 which is mounted on a shaft 22. The two rotatable drums are sealed by means of cap seal 24.

The friction clutch comprises a first disc 25 mounted on the shaft 21 by means of the set screw 26 and a second clutch disc 27 which is fixedly mounted to the actuator arm 13. A friction material, felt, is fixed to disc 25. The friction clutch is adapted to be adjustably assembled on the shaft 22 by means of spring washers 28, 29, 30 and retainer collar 31 which is adapted to be connected to the shaft 22 by means of set screw 32. One side of the control switch 14 is connected to a source of electricity 33 and in this illustration the switch is held in "on" position when the machine is operating at normal speed.

The device operates in the following manner. As the input shaft of the fluid clutch rotates, it is coupled to the inner section of the fluid clutch and starts to rotate causing the friction clutch to rotate the switch actuating lever which depresses the snap-action switch.

The lever is then stopped. However, since the input shaft is still rotating, slippage first occurs in the fluid coupling. However, as the speed builds up and the torque output of the fluid coupling increases, a point is reached wherein the friction clutch begins to slip. If, for any reason, the system ceases to rotate, the spring in the switch causes the lever to reverse direction. The friction clutch now no longer slips but the fluid clutch allows reverse movement. This will take place whether or not the input shaft is stationary or reverses direction.

It can be seen that, if the device were to consist of the friction clutch alone that upon initial rotation, the switch would actuate, but when the rotation ceased and the input shaft was held in a fixed position, then the force of the spring within the switch could not cause the actuating lever to reverse direction. The fluid coupling is necessary to provide this feature. Conversely, if the fluid coupling was provided without the friction clutch, the torque output or torque loading would increase loading the input shaft more with higher rotational speeds.

It can be seen that this device can be used to detect the presence of rotation of a given shaft. In dry thermal copy machines the input into the device is taken from a roller which is contacted with the glass roller which in turn is driven from yet another roller. If the glass roller stops, the roller connected to the device also stops, ultimately resulting in the switch opening. Thus, if the glass rollers stop for any reason causing the rollers to stop and exposing a given area to the heat from the exposure lamp for a longer than normal period of time, the possibility of the damage due to burning is eliminated by the deactuation of a switch in series with the lamp. This device will find application in other fields as well as in office copying machining providing a cheap, simple, method for detecting shaft rotation.

Many modifications may be made by those who desire to practice the invention without departing from the scope thereof which is defined by the following claims.

We claim:

1. Stall detector means for a rotatable shaft driven by a motor comprising, a fluid coupling connected to said shaft, a friction clutch connected to the output of said fluid coupling, an actuator connected to an output of said clutch and a spring loaded switch connected to be operated by said actuator, said control switch being connected to actuate said motor.

References Cited
UNITED STATES PATENTS

| | | | |
|---|---|---|---|
| 2,512,853 | 6/1950 | Eaton | 192—3.21 X |
| 2,640,899 | 6/1953 | Dickey | 200—153 |
| 2,699,849 | 1/1955 | Foster et al. | 192—3.21 |
| 2,726,513 | 12/1955 | McWethy et al. | 192—3.21 X |
| 2,757,327 | 7/1956 | Olwer | 318—475 |

ORIS L. RADER, Primary Examiner

LESTER L. HEWITT, Assistant Examiner